United States Patent
Petri

[15] 3,698,748
[45] Oct. 17, 1972

[54] MEANS FOR SECURING AN INSERT TO A BASE PIECE

[72] Inventor: Nello J. Petri, 2140 Jones, San Francisco, Calif. 94133

[22] Filed: Feb. 28, 1972

[21] Appl. No.: 229,989

Related U.S. Application Data

[63] Continuation-in-part of Ser. No. 122,947, March 10, 1971.

[52] U.S. Cl. ................................287/20.3, 279/76
[51] Int. Cl. ............................................F16b 12/20
[58] Field of Search ..............83/698; 279/30, 83, 76; 287/52.08, 20.3; 299/92

[56] References Cited

UNITED STATES PATENTS

| | | |
|---|---|---|
| 2,416,285 | 2/1947 | Buckingham et al. ....279/83 X |
| 2,431,566 | 11/1947 | Kopczynski..............83/698 X |
| 2,996,291 | 8/1961 | Krekeler......................299/92 |

Primary Examiner—Andrew V. Kundrat
Attorney—Gordon Wood

[57] ABSTRACT

Means for removably securing an insert element to a larger base piece. The invention as disclosed solves the problem of securing an insert element, such as a punch, to a larger base piece such as a punch ring. In lieu of the usual set screw method of securing the punches to the punch ring, quick releasable means is provided for fixedly but removably securing the shank of a punch or the like within a bore in the punch ring. The cross sectional contour of the bore is formed so that the shank engages the bore at two points in cross section. The shank is forced against said two points by means of a pair of spring pressed elements, one of said elements also contributing to urging the shank against the bottom of the bore. The use of two spring pressed elements greatly contributes to the stability of shank in the bore and which stability could not be obtained by use of one spring pressed element regardless of the amount of force exerted by such element.

3 Claims, 2 Drawing Figures

PATENTED OCT 17 1972 3,698,748

MEANS FOR SECURING AN INSERT TO A BASE PIECE

This application is a continuation-in-part of application Ser. No. 122,947 filed Mar. 10, 1971.

The invention relates to means for accurately and firmly positioning a replaceable element with respect to a larger member or base piece. The invention will be described with respect to replaceable punch elements which are inserted in the periphery of a rotatable punch ring for the purpose of punching holes in a paper strip or the like. Details of such punch ring not referred to herein may be seen in the above noted copending application.

As stated in the copending application, the problem of firmly positioning a removable punch with respect to a punch ring may be solved without the use of set screws by employing a spring urged element which forces the punch shank against the opposite side of the bore and at the same time urging the shank by such spring pressed element against the bottom of the bore. It has been found, however, that any force on the cutting end of the punch which is not directed longitudinally of the axis of the punch tends to tilt the punch away from its points of engagement with the bore against the urgency of such spring pressed means. An obvious solution to this problem would be to increase the strength of the spring of the spring pressed element so as to resist such lateral forces. However, because of the geometry of the assembly and because of the great mechanical advantage of a force at the outer working end of the punch, the strength of such spring would become inordinately great so as to make much more difficult, if not impossible, the steps of removing and inserting the punch.

The main object of the present invention is therefore the provision of an improved structure for retaining a removable insert in a base piece.

Another object of the invention is the provision of means for retaining a removable element such as a punch in a base piece or punch ring and which means improves the stability of the insert with respect to the base piece and at the same time requires less effort on the part of an operator to remove and install the insert.

Other objects of the invention will be seen from the following specification and from the drawings.

Figure 1:
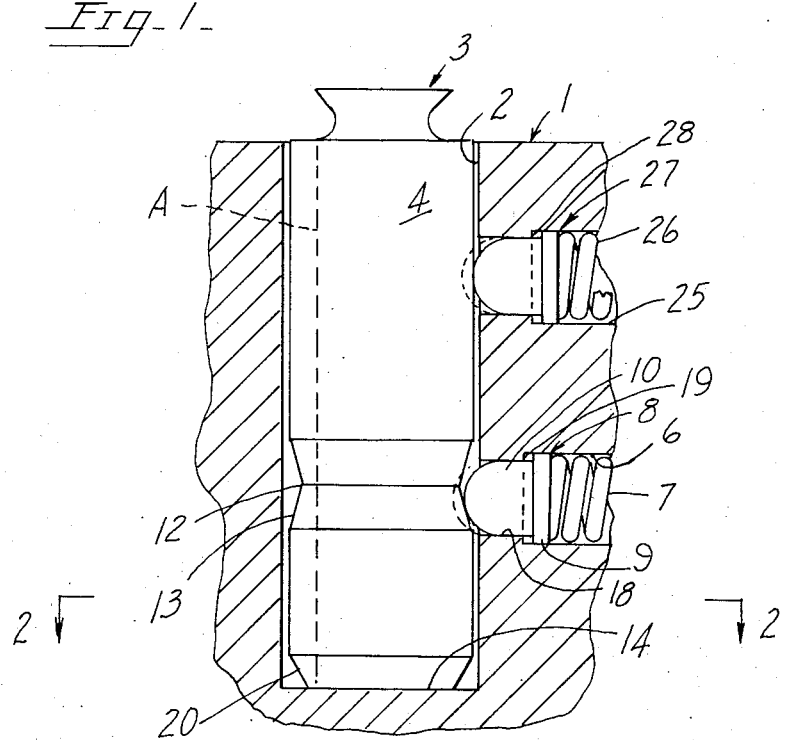
FIG. 1 is a cross sectional view of a punch ring showing the insert in place and the holding means therefor.
Figure 2:
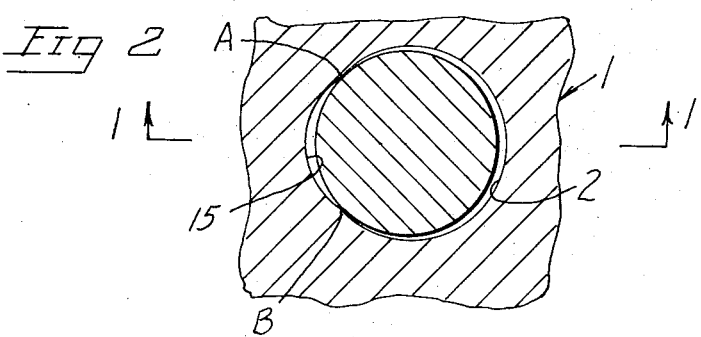
FIG. 2 is a transverse cross sectional view through the bore showing the shank of the punch element received therein. The clearance between the shank of the punch element and the bore in which it is received is greatly exaggerated for clarity.

In detail, and first with reference to FIG. 1, the base piece or punch ring is indicated generally at 1 and one of the outwardly opening bores in piece 1 is indicated at 2. The punch generally designated 3 is provided with an elongated shank 4 which may be a few thousandths of an inch less in diameter than the diameter of the bore 2. On one side of the bore 2 a transversely extending opening 6 is drilled to receive a compression spring 7 and a spring pressed element generally designated 8. Said element 8 is provided with a circular base 9 slidably received in bore 6 and integral with said base is a generally ball-shaped end 10, which, when the shank 4 is inserted, cooperates with a V-shaped groove 12 formed on the periphery of shank 4. As best seen in FIG. 1 the position of V-shaped groove 12 and the bore 6 is predetermined so that the outer end of the spring pressed element 10 makes point contact with camming surface 13, which in turn constitutes one side of the groove 12. It will be apparent that by this structure the punch is forced to the left as seen in FIG. 1 and at the same time is forced downwardly against the bottom 14 of the bore 2. As best seen in FIG. 2, the side of the bore opposite the element 10 is enlarged, preferably by milling, as indicated at 15. The depth of such enlargement 15 need not be very great but merely sufficient to cause the shank 4 to engage the inner side of bore 2 at lines A and B (FIG. 2), extending longitudinally of the bore.

The inner end of bore 6 is reduced in diameter to provide a cylindrical hold 18 for slidably receiving the inner end of element 10 therein. By this structure an annular shoulder 19 is formed, against which the base 9 is adapted to abut when the punch is withdrawn from the bore 2. Thus it will be apparent that the movement of the spring urged element 8 to the left may be restricted to a very small amount so as to provide less resistance during the steps of inserting and removing the punch. In this same connection, the inner end of shank 4 is tapered as indicated at 20 to facilitate the insertion of the shank within the bore. The inner position of element 10 is shown in dotted lines in FIG. 1 and it will be noted that less resistance is encountered to inserting the shank 4 than would be encountered if the inner position were radially inward of that shown.

By the present invention a second cylindrical hole 25 is provided between hole 6 and the outer side of ring 1. This hole 25 also is provided with a spring 26 which urges an element 27 (similar to element 8) against the cylindrical side walls of shank 4. Again, a shoulder 28 is provided for limiting the inward movement of element 27 so that its inner position, indicated in dotted lines, is close enough to the inner sidewalls of bore 2 not to interfere unnecessarily with the steps of removing and inserting the shank.

It will be understood that the springs 7 and 26 need not be so strong as to make difficult the steps of inserting and withdrawing the punch. The lightness in the springs is made up for by the fact that the spring 26 adequately resists any lateral forces on the punch 3 since it is fairly close to the outer end of the latter. The spring pressed element 8 further contributes to forcing the part against the opposite side of the bore and at the same time contributes to holding the shank 4 against the bottom 14 of the bore which is desirable.

I claim:

1. In the combination that includes a base piece and an element secured thereto:

said base piece being formed with a bore opening outwardly of one face thereof, said element including a shank adapted to be received in said bore through the open end thereof, a first spring pressed element on one side of said bore urging said shank transversely of said bore toward the opposite side thereof, said shank and bore being formed in cross section to provide two spaced points of engagement between said shank and said bore at said opposite side, the cross sectional contour of said shank being smaller than the cross sectional contour of said bore to provide clearance therebetween whereby the periphery of said shank is engaged only by said force means and said bore at said two points to provide stability of said element relative to said base piece.

said bore being provided with a bottom rigid with said base piece and said shank being provided with a camming surface acted upon by said first spring pressed element to urge said shank against said bottom at the same time it is urged toward said opposite side.

a second spring pressed element axially spaced from said first spring pressed element for urging said shank against said opposite side.

2. The combination of claim 1 wherein said second element is interposed between said first element and the outer open end of said bore.

3. The combination of claim 1 wherein a stop is provided for limiting the radially inward movement of one of said elements.

* * * * *